United States Patent [19]
Yasukohchi et al.

[11] Patent Number: 5,920,673
[45] Date of Patent: Jul. 6, 1999

[54] APPARATUS AND METHOD FOR RECORDING DIGITAL DATA

[75] Inventors: Ryuji Yasukohchi, Chiba; Akio Uesugi; Masaki Sato, both of Tokyo; Hiroshi Nishikawa, Kanagawa, all of Japan

[73] Assignee: Matsushita Electric Industrial Co., Ltd., Osaka, Japan

[21] Appl. No.: 08/758,594

[22] Filed: Nov. 27, 1996

[30] Foreign Application Priority Data

Dec. 1, 1995 [JP] Japan .................................. 7-314134

[51] Int. Cl.⁶ ...................................................... H04N 5/91
[52] U.S. Cl. .............................. 386/46; 386/124; 386/125; 386/129; 360/5
[58] Field of Search ........................ 386/44, 45, 125–126, 386/46, 124, 129; 360/5; 369/32, 50; 348/143, 152, 154–155; H04N 5/91

[56] References Cited

U.S. PATENT DOCUMENTS

| | | | |
|---|---|---|---|
| 4,558,379 | 12/1985 | Hutter et al. | 360/32 |
| 4,807,179 | 2/1989 | Clere et al. | 364/900 |
| 4,862,394 | 8/1989 | Thompson et al. | 360/5 |
| 5,025,324 | 6/1991 | Hashimoto | 360/5 |
| 5,184,215 | 2/1993 | Barker | 358/93 |
| 5,282,092 | 1/1994 | Wilhelms | 360/5 |
| 5,293,273 | 3/1994 | Glick | 360/5 |
| 5,345,430 | 9/1994 | Moe | 369/7 |
| 5,438,423 | 8/1995 | Lynch et al. | 358/335 |
| 5,537,552 | 7/1996 | Ogasawara et al. | 395/250 |

*Primary Examiner*—Wendy Garber
*Assistant Examiner*—Vincent F. Boccio
*Attorney, Agent, or Firm*—Pearne, Gordon, McCoy & Granger LLP

[57] ABSTRACT

A recording apparatus that can implement an endless recording function and a prealert recording function for video and audio data using a single random access recording medium having excellent random accessibility will be provided. The recording apparatus includes: an input section 101 that receives data; a recording section 103 that has a random access recording medium and makes a data recording onto the random access recording medium; and a control section 104 that sequentially records data onto recording sectors by controlling data transfer between the input section and the recording section. By causing the control section to repetitively overwrite data to a recording area, the endless recording function can be implemented.

4 Claims, 6 Drawing Sheets

APPARATUS AND METHOD FOR RECORDING DIGITAL DATA

BACKGROUND OF THE INVENTION

The present invention relates to a recording apparatus that has an endless recording function by which high-speed, large-volume digital data represented by real-time stream data such as video data and audio data is recorded endlessly and a prealert recording function by which when an alert signal indicating some kind of abnormality has been detected during endless recording, data before and after the alert signal detecting timing is stored.

Along with increasing processing speed of processors and decreasing prices of memories and secondary recording media, there is a growing demand for recording apparatuses that can record high-speed, large-volume digital data represented by real-time stream data such as video data and audio data. There is also a growing demand for recording apparatuses adapted for monitoring applications. That is, for the security of automatic teller machines and factories, there is a growing demand for recording apparatuses that have an endless recording function by which monitoring data is recorded endlessly and a prealert recording function by which when an alert signal indicating some kind of abnormality has been detected during endless recording, data before and after the alert signal detecting timing is stored.

A conventional recording apparatus will hereunder be described with reference to the drawings. FIG. 5 is a diagram showing a configuration of a conventional recording apparatus. In FIG. 5, reference numeral 401 denotes an input section that inputs data; 402, a first recording section that has an endless magnetic tape as a recording medium and records data onto the magnetic tape; 403, a buffer section that temporarily stores data for a predetermined time period; 404, a second recording section that has a non-endless magnetic tape as a recording medium and records data onto such magnetic tape; 405, a control section that controls data transfer between the input section 401 and the first recording section 402, between the input section 401 and the buffer section 403, and between the buffer section 403 and the second recording section 404. Further, reference numerals 406-1, 406-2, ..., ..., 406-n denote analog video and audio input units that input analog video data and analog audio data; 407, an analog video and audio input switching unit that controls the inputting of analog video data and analog audio data; 408, a video data analog-to-digital converting unit that digitizes analog video data; 409, an audio data analog-to-digital converting unit that digitizes analog audio data; 410, a digital video data compressing unit that compresses digital video data; 411, a digital audio data compressing unit that compresses digital audio data; and 412, a compressed digital video and audio data multiplexing unit that multiplexes digital compressed video data and digital compressed audio data. These components constitute the input section 401.

An operation of the thus configured recording apparatus will be described with reference to FIG. 6. FIG. 6 is a diagram showing a process flow of the control section. First, the control section 405 starts simultaneous data transfer between the input section 401 and the first recording section 402 and between the input section 401 and the buffer section 403 (step 502). This data transfer operation is continuously performed until data recording is ended. During this operation, in the first recording section 402, data is repetitively recorded onto the endless magnetic tape. In the buffer section 403, the data is repetitively recorded in a ring buffer.

Here, a flow of data in the input section 401 will be described. The analog video and audio input units 406-1, 406-2, ..., ..., 406-n output analog video data and analog audio data to the analog video and audio input switching unit 407, respectively. The analog video and audio input switching unit 407 switches the analog video and audio input unit at a predetermined time interval while instructed by the control section 405, so that analog video data and analog audio data to be recorded are switched. The video data analog-to-digital converting unit 408 subjects the analog video data switched by the analog video and audio input switching unit 407 to an analog-to-digital conversion process, and delivers the digital video data to the digital video data compressing unit 410. The digital video data compressing unit 410 compresses the digital video data delivered from the video data analog-to-digital converting unit 408, and delivers digital compressed video data to the digital compressed video and audio data multiplexing unit 412. On the other hand, the audio data analog-to-digital converting unit 409 subjects the analog audio data switched by the analog video and audio input switching unit 407 to an analog-to-digital conversion process, and delivers digital audio data to the digital audio data compressing unit 411.

The digital audio data compressing unit 411 compresses the digital audio data delivered from the audio data analog-to-digital converting unit 409, and delivers digital compressed audio data to the digital compressed video and audio data multiplexing unit 412. Further, the digital compressed video and audio data multiplexing unit 412 multiplexes the digital compressed video data delivered from the digital video data compressing unit 410 and the digital compressed audio data delivered from the digital audio data compressing unit 411, and outputs stream data.

Then, in step 503, the control section 405 detects an alert signal outputted from the analog video and audio input units 406-1, 406-2, ..., ..., 406-n. If no alert signal has been detected, the control section 405 advances to step 505. If an alert signal has been detected, the control section 405 transfers data between the buffer section 403 and the second recording section 404 for a predetermined time period (step 504), and advances to step 505. In step 504, by recording data already stored in the buffer section 403 at the alert signal detecting timing, not only data corresponding to the capacity of the buffer section before the alert signal detecting timing can be recorded, but also data corresponding to a predetermined time after the alert signal detecting timing can be recorded. Finally, in step 505, if an endless recording end instruction is not given, the control section 405 returns to step 503 to repeat the above operation. If an endless recording end instruction has been given, the control section 405 ends the operation (step 506).

However, in the conventional recording apparatus, in order to implement the endless recording function and prealert recording function for video data and audio data in the video and audio input unit of the input section, the video data and the audio data in the video and audio input unit are repetitively recorded onto the endless magnetic tape of the first recording section and the buffer section during endless recording, and when an alert signal has been detected, the video data and the audio data stored in the buffer before and after the alert signal detecting timing is recorded onto the magnetic tape of the second recording section. Therefore, two recording sections must be arranged, which in turn has imposed the problem that the recording apparatus becomes expensive. In addition, the data is recorded onto magnetic tapes, which in turn has imposed the problem that much time is entailed in searching data after recording.

SUMMARY OF THE INVENTION

The present invention has been made to overcome the aforementioned problems. The object of the present invention is to provide a recording apparatus that can implement an endless recording function and a prealert recording function for video and audio data in the video and audio input unit using a single random access type recording medium that has excellent random-accessibility.

To achieve the above object, the present invention has a configuration including: an input section for inputting data; a recording section having a random access type recording medium, that records data onto the random access type recording medium; and a control section for controlling data transfer between the input section and the recording section and sequentially recording data onto recording sectors.

A recording apparatus of the present invention comprises: an input section for inputting data; a recording section having a random access type recording medium, that records data onto the random access type recording medium; and a control section for controlling data transfer between the input section and the recording section and sequentially recording data onto recording sectors.

Further, in the aforementioned recording apparatus, during an endless recording operation in which data is repetitively overwritten onto a recording area A of the random access type recording medium, the recording apparatus is controlled in such a manner that writing is prohibited onto a recording area B in which data is recorded from a timing (T−T0) to a timing (T+T1) including an alert signal detecting timing T and that recording is continued onto a recording area (A−B) which is obtained by excluding the recording area B from the recording area A after a timing (T+T1).

Still further, in the aforementioned recording apparatus, the recording area A is formed of equal length recording segments a(0), a(1), a( . . . ), a(i), a( . . . ), a(n); and the control section prohibits writing onto a recording area C including not only an equal length recording segment a(i) in which data at the alert signal detecting timing T is recorded but also a predetermined number of equal length recording segments before and after the equal length recording segment a(i), and continues recording onto a recording area (A−C) which is obtained by excluding the recording area C from the recording area A after a timing (T+T2) corresponding to final data in the recording area C.

A recording method of the present invention involves at least the first step of inputting data and the second step of sequentially recording the inputted data onto a random access type recording medium, and as a sequential recording method in the second step, during an endless recording operation in which data is repetitively overwritten onto a recording area A of the random access type recording medium, writing is prohibited onto a recording area B in which data is recorded from a timing (T−T0) to a timing (T+T1) including an alert signal detecting timing T, and recording is continued onto a recording area (A−B) which is obtained by excluding the recording area B from the recording A after the timing (T+T1).

Further, in the aforementioned recording method, the recording area A is formed of equal length recording segments a(0), a(1), a( . . . ), a(i), a( . . . ), a(n), and writing is prohibited onto a recording area C including not only an equal length recording segment a(i) in which data at the alert signal detecting timing T is recorded but also a predetermined number of equal length recording segments before and after the equal length recording segment a(i), and recording is continued onto a recording area (A−C) which is obtained by excluding the recording area C from the recording area A after a timing (T+T2) corresponding to final data in the recording area C.

The present invention implements the endless recording function by causing the control section to repetitively overwrite data onto the recording area A. Since the prealert recording function is implemented by a single recording medium, the recording apparatus is either controlled in such a manner that writing is prohibited onto the recording area B in which data is recorded from the timing (T−T0) to the timing (T+T1) including the alert signal detecting timing T and recording is continued onto the recording area (A−B) which is obtained by excluding the recording area B from the recording area A after the timing (T+T1), or controlled in such a manner that by forming the recording area A of equal length recording segments a(0), a(1), a( . . . ), a(i), a( . . . ), a(n), writing is prohibited onto the recording area C including not only an equal length recording segment a(i) in which data at the alert signal detecting timing T is recorded but also a predetermined number of equal length recording segments before and after the equal length recording segment a(i), and recording is continued onto the recording area (A−C) which is obtained by excluding the recording area C from the recording area A after the timing (T+T2) corresponding to the final data in the recording area C.

DETAILED DESCRIPTION OF THE PREFERRED EMBODIMENTS

An embodiment of the present invention will now be described with reference to FIGS. 1 to 4.

Figure 1:
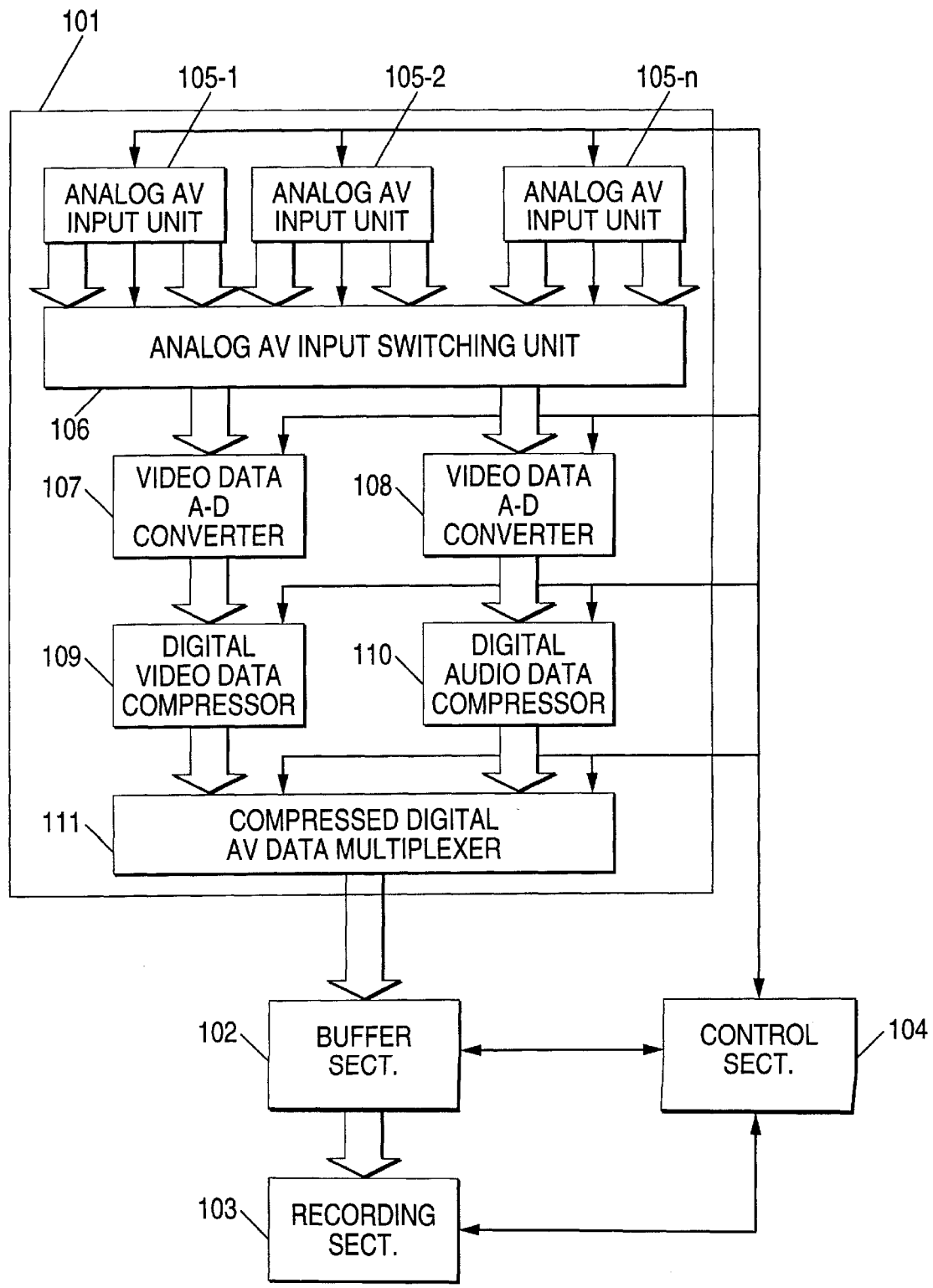
FIG. 1 is a diagram showing a configuration of a recording apparatus, which is one mode of embodiment of the present invention.

FIG. 1 is a diagram showing a configuration of a recording apparatus in a mode of embodiment. In FIG. 1, reference numeral 101 denotes an input section that inputs data; 102, a buffer section that temporarily stores data for a predetermined time period; 103, a recording section that has a disk type storage medium such as a rewritable optical disk or magnetic disk and records data onto such disk type recording medium; and 104, a control section that controls data transfer between the input section 101 and the buffer section 102 as well as between the buffer section 102 and the recording section 103. Further, reference numerals 105-1, 105-2, . . . , . . . , 105-n denote analog video and audio input units that receive analog video data and analog audio data; 106, an analog video and audio input switching unit that controls the inputting of analog video data and analog audio data; 107, a video data analog/digital converting unit that digitizes analog vido data; 108, an audio data analog/digital converting unit that digitizes analog audio data; 109, a digital video data compressing unit that compresses digital video data; 110, a digital audio data compressing unit that compresses digital audio data; and 111, a digital compressed video and audio data multiplexing unit that multiplexes digital compressed video data and digital compressed audio data.

These components are the same as those denoted as 406-1, 406-2, . . . , . . . , 406-n, 407, 408, 409, 410, 411, 412 in the configuration of the conventional example, and constitute the input section 101 in a manner similar to the conventional example.

Figure 2:
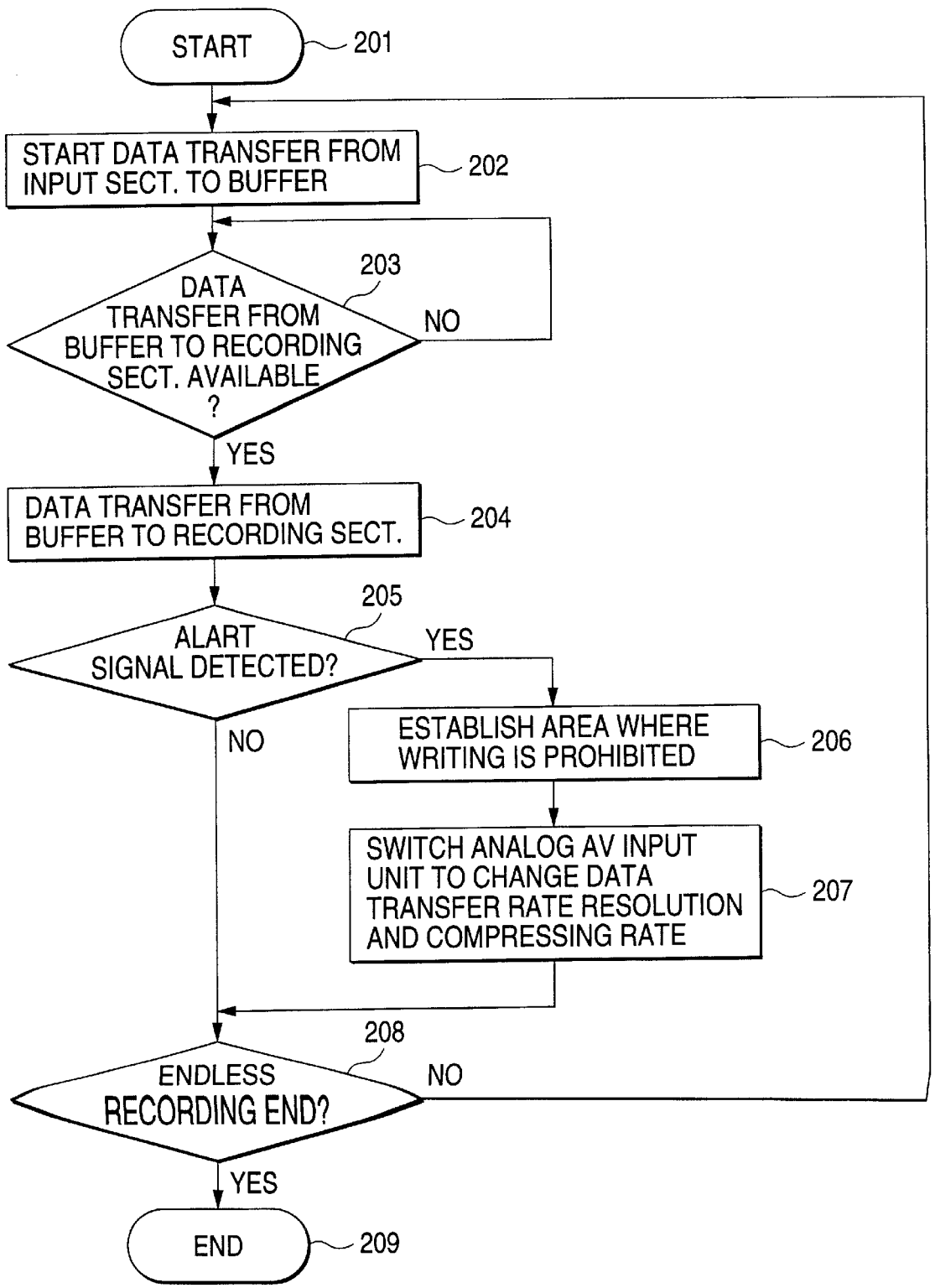
FIG. 2 is a flow diagram showing the process performed by a control section in the mode of embodiment of the present invention.
Figure 3:
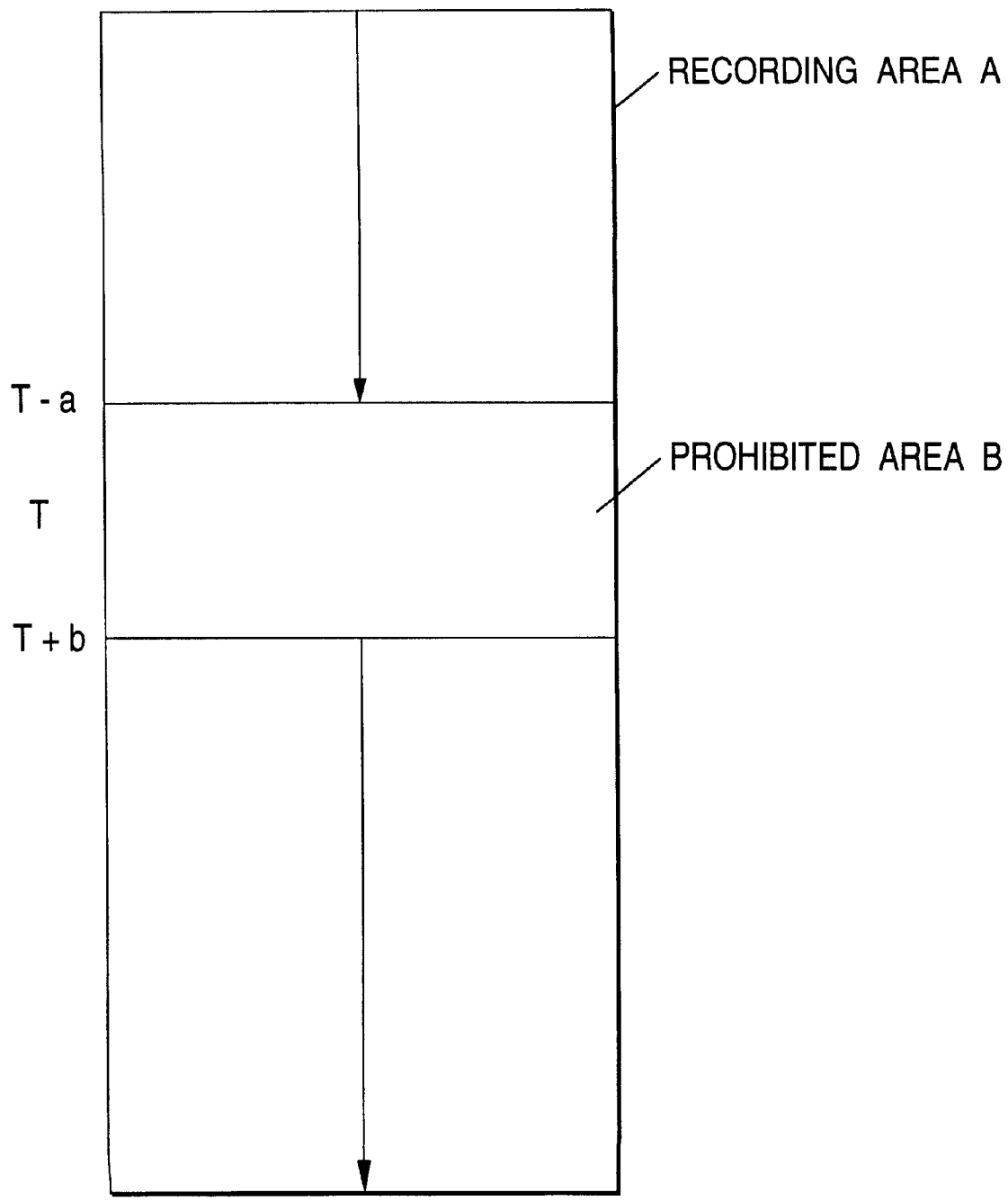
FIG. 3 is a first conceptional diagram showing an exemplary system of endless recording and prealert recording in the mode of embodiment of the present invention.
Figure 4:
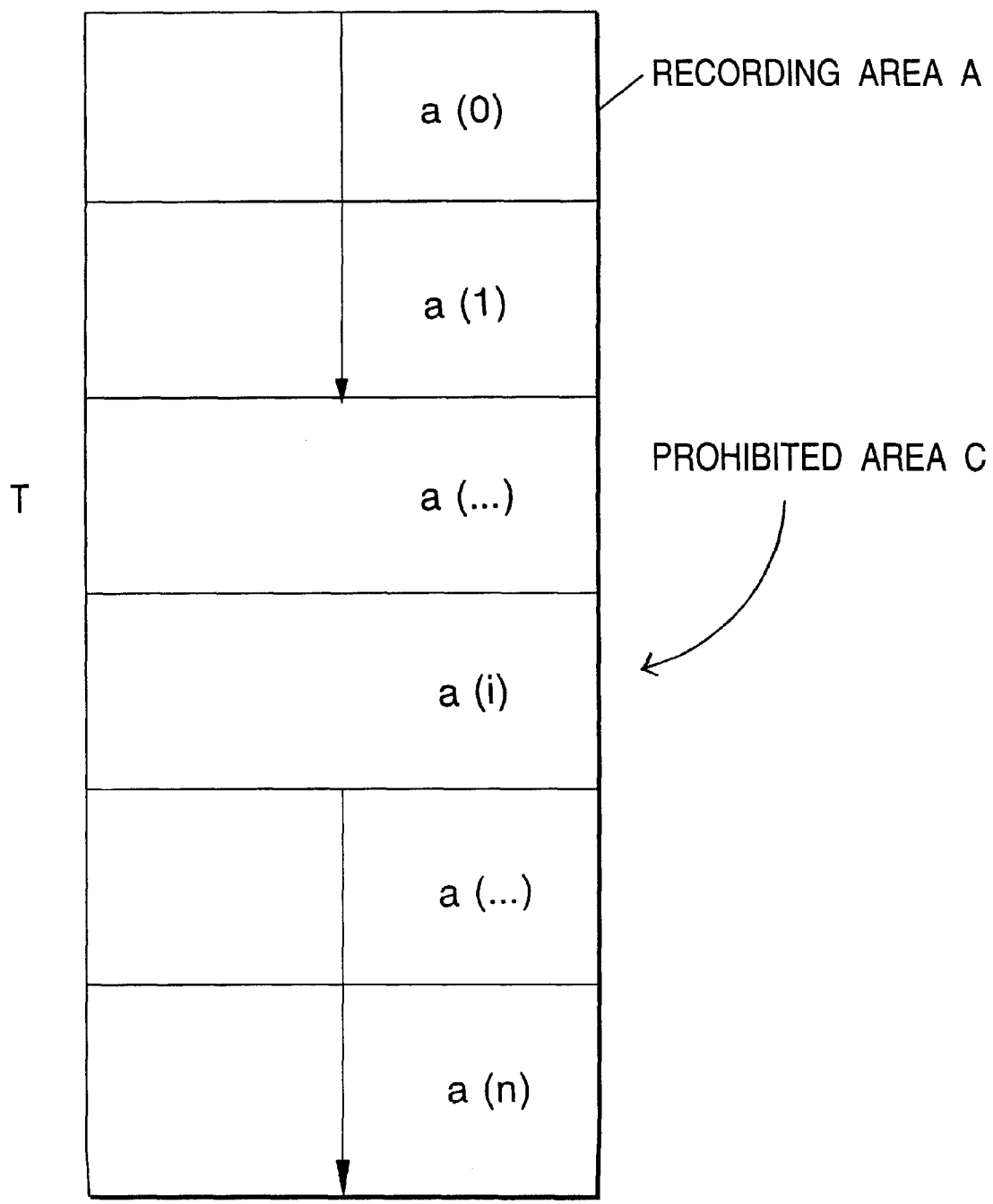
FIG. 4 is a second conceptional diagram showing an exemplary system of endless recording and prealert recording in the mode of embodiment of the present invention.
Figure 5:
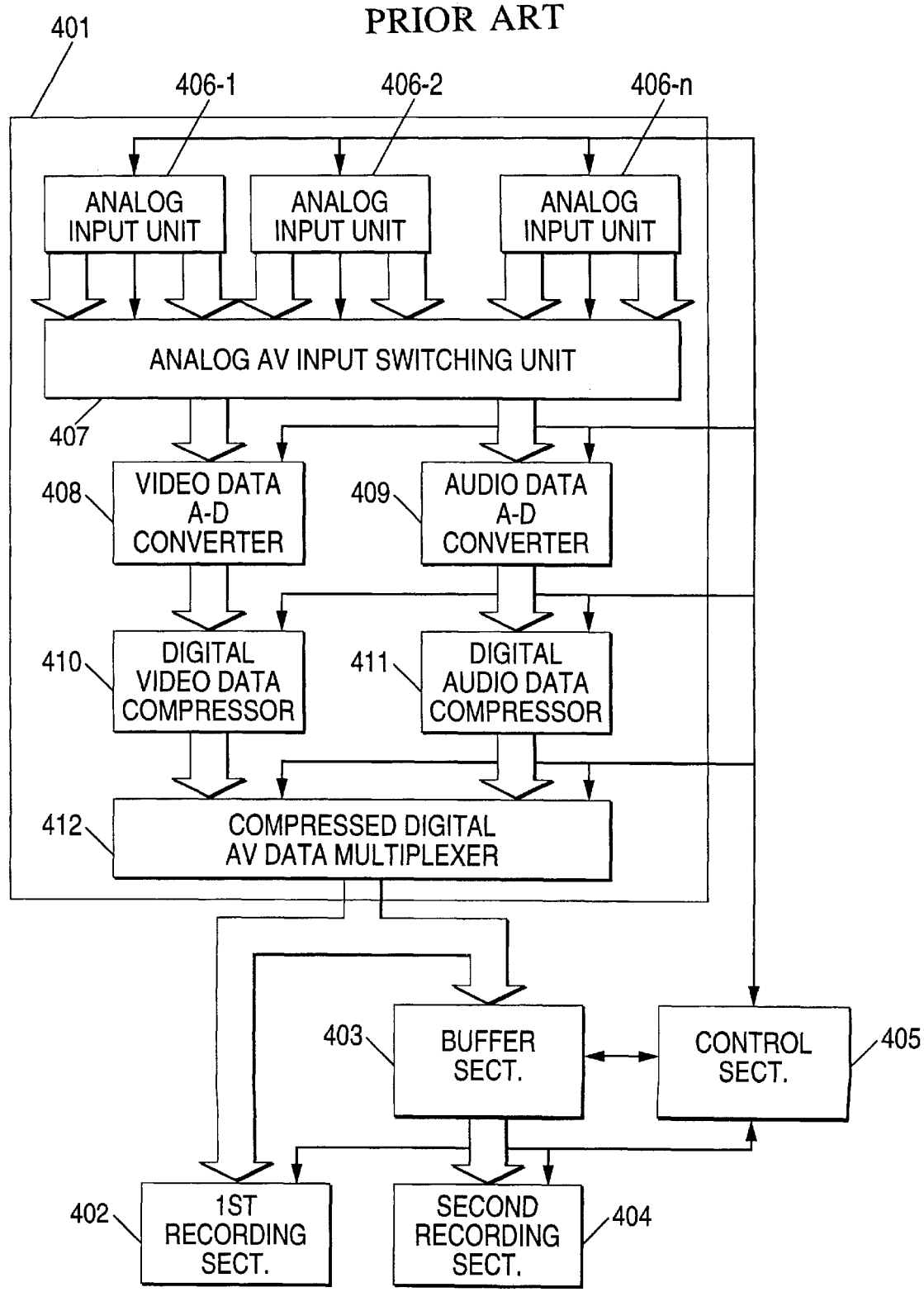
FIG. 5 is a diagram showing a configuration of a recording apparatus in a conventional example.
Figure 6:
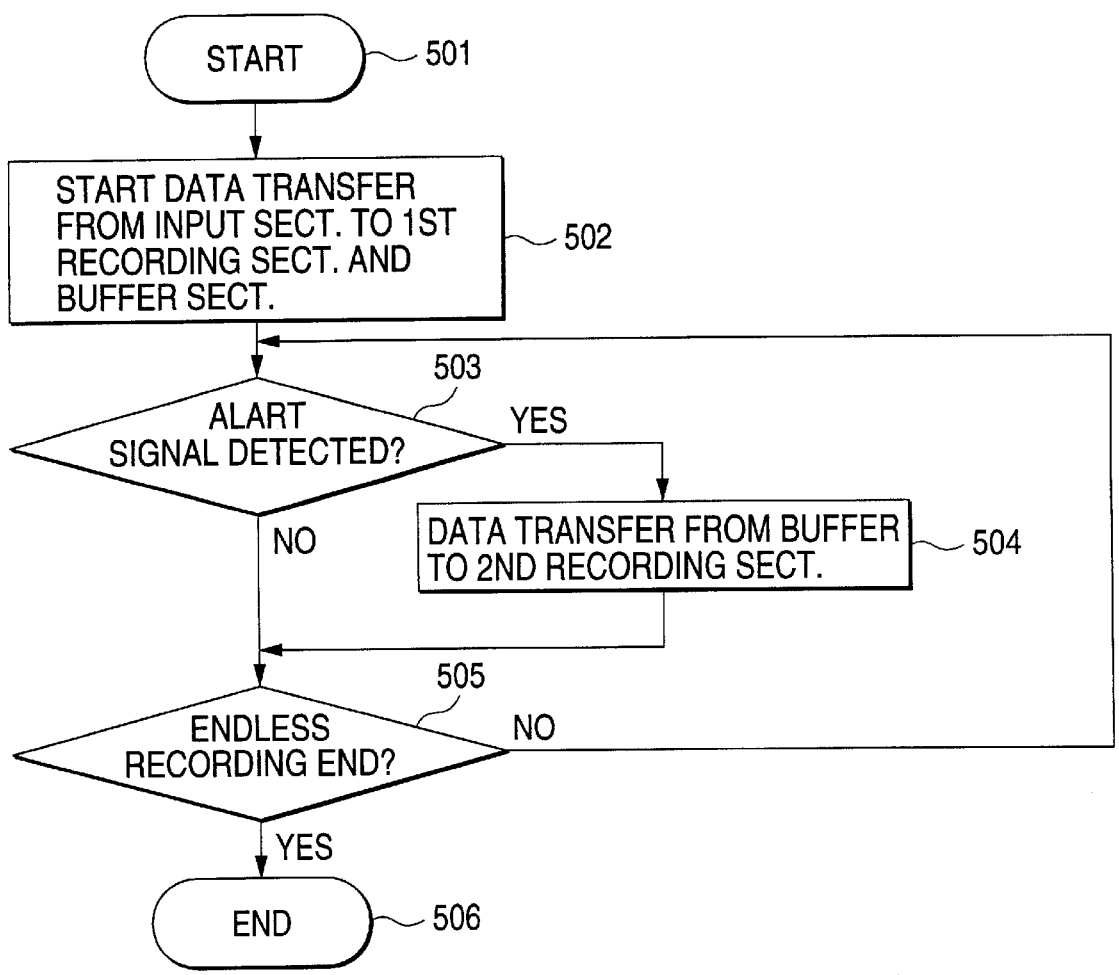
FIG. 6 is a flow diagram of the process performed by a control section in the conventional example.

An operation of the thus configured recording apparatus will be described with reference to FIGS. 2, 3, and 4. FIG. 2 is a diagram showing a process flow of the control section, and FIGS. 3 and 4 show exemplary systems for implementing endless recording and prealert recording. First, the control section 104 starts data transfer between the input section 101 and the buffer section 102 (step 202). Data transfer between the input section 101 and the buffer section 102 is thereafter continued at a predetermined transfer rate until endless recording ends. In step 203, the control section 104 checks whether or not a predetermined amount of data stored in the buffer section 102 can be transferred. If not, the control section 104 repeats step 203. If it is found out in step 203 that a predetermined amount of data can be transferred, then data transfer between the buffer section 102 and the recording section 103 is started (step 204). In step 205, the control section 104 checks whether or not an alert signal has been detected. If no alert signal has been detected, the control section 104 advances to step 208. If an alert signal has been detected in step 205, the control section 104 prohibits data writing onto a data recording area for a predetermined time interval before and after the alert signal detecting timing including such alert signal detecting timing (step 207).

Here, two systems for implementing the endless recording function and the prealert recording function will be presented. These systems require the use of a randomly accessible disk, and it should be noted that endless recording is implemented by repetitively updating a series of sector areas. First, as shown in FIG. 3, the first system is designed so that during endless recording in which data is being overwritten repetitively in a recording area A, writing is prohibited onto a recording area B in which data is recorded from a timing (T−T0) to a timing (T+T1) including an alert signal detecting timing T and recording is continued onto a recording area (A−B) which is obtained by excluding the recording area B from the recording area A after the timing (T+T1). Then, as shown in FIG. 4, the second system is designed so that the recording area A is formed of equal length recording segments a(0), a(1), a( . . . ), a(i), a( . . . ), a (n); and writing is prohibited onto a recording area C including not only an equal length recording segment a(i) in which data at an alert signal detecting timing T is recorded but also a predetermined number of equal length recording segments before and after the equal length recording segment a(i), and recording is continued onto a recording area (A−C) which is obtained by excluding the recording area C from the recording area A after a timing (T+T2) corresponding to the last data in the recording area C.

Then, in step 207, the control section 104 instructs the analog video and audio input switching unit to switch video data and audio data input to the video and audio input unit that has outputted the alert signal from the alert signal detecting timing T to a timing (T+T3). The control section 104 then instructs the analog video and audio input unit to change frame rate and resolution, instructs the digital video data compressing unit 109 and the digital audio data compressing unit 110 to change compressing rate, and then advances to step 208. Finally, in step 208, if an endless recording end instruction has not been given, the control section 104 returns to step 203 to perform the aforementioned operations. If an endless recording end instruction has been given, the control section 104 ends the endless recording operation (step 209).

As described above, by providing an input section that inputs data, a recording section that has a disk type recording medium and makes a data recording onto the disk type recording medium, and a control section that controls data transfer between the input section and the recording section to thereby sequentially record data onto recording sectors, the present invention can implement, using a single recording medium having excellent random-accessibility, the endless recording function by which video data and audio data are recorded endlessly and the prealert recording function by which when an alert signal indicating some kind of abnormality has been detected during endless recording, video data and audio data before and after an alert signal detecting timing are stored.

What is claimed is:

1. A recording apparatus comprising:

an input section for inputting data;

a buffer section for temporarily storing data from the input section;

a recording section having a random access type recording medium, that records data from the buffer section onto the random access type recording medium; and a control section for controlling data transfer between the input section and the buffer section, and for controlling data transfer between the buffer section and the recording section and sequentially recording data onto recording sectors, wherein during an endless recording operation in which data from the buffer section is repetitively overwritten onto a recording area A of the random access type recording medium, the control section prohibits writing onto a recording area B in which data is recorded from a timing (T−T0) to a timing (T+T1) including an alert signal detecting timing T, and continues recording onto a recording area (A−B) being obtained by excluding the recording area B from the recording area A after a timing (T+T1).

2. A recording apparatus according to claim 1, wherein the recording area A is formed of equal length recording segments a(0), a(1), a( . . . ), a(i), a( . . . ), a(n); and the control section prohibits writing onto a recording area C including not only an equal length recording segment a(i) in which data at the alert signal detecting timing T is recorded but also a predetermined number of equal length recording segments before and after the equal length recording segment a(i), and continues recording onto a recording area (A−C) which is obtained by excluding the recording area C from the recording area A after a timing (T+T2) corresponding to final data in the recording area C.

3. A recording method comprising the steps of:

inputting data;

temporarily storing the data in a buffer; and sequentially recording the data from the buffer onto a random access type recording medium using an endless recording operation in which data is repetitively overwritten onto the recording area A of the random access type recording medium, and writing is prohibited onto a recording area B in which data from the buffer is recorded from a timing (T−T0) to a timing (T+T1) including an alert signal detecting timing T, and recording is continued onto a recording area (A−B) which is obtained by excluding the recording area B from the recording A after the timing (T+T1).

4. A recording method according to claim 3, wherein the recording area A is formed of equal length recording segments a(0), a(1), a( . . . ), a(i), a( . . . ), a(n), and writing is prohibited onto a recording area C including not only an equal length recording segment a(i) in which data at the alert signal detecting timing T is recorded but also a predetermined number of equal length recording segments before and after the equal length recording segment a(i), and recording is continued onto a recording area (A−C) which is obtained by excluding the recording area C from the recording area A after a timing (T+T2) corresponding to final data in the recording area C.

* * * * *